(12) United States Patent
Xu et al.

(10) Patent No.: US 7,765,251 B2
(45) Date of Patent: Jul. 27, 2010

(54) SIGNAL AVERAGING CIRCUIT AND METHOD FOR SAMPLE AVERAGING

(75) Inventors: Yansun Xu, Mountain View, CA (US); Gopalakrishnan P. Krishnan, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 1032 days.

(21) Appl. No.: 11/303,363

(22) Filed: Dec. 16, 2005

(65) Prior Publication Data

US 2007/0143383 A1    Jun. 21, 2007

(51) Int. Cl.
G06F 7/38    (2006.01)
(52) U.S. Cl. ..................................................... 708/445
(58) Field of Classification Search .................. 708/445
See application file for complete search history.

(56) References Cited

U.S. PATENT DOCUMENTS

| | | | |
|---|---|---|---|
| 3,922,093 A | 11/1975 | Dandliker et al. | |
| 4,225,240 A | 9/1980 | Balasubramanian | |
| 4,546,347 A | 10/1985 | Kirsch | |
| 4,740,675 A | 4/1988 | Brosnan et al. | |
| 4,751,380 A | 6/1988 | Victor et al. | |
| 4,799,055 A | 1/1989 | Nestler et al. | |
| 4,814,553 A | 3/1989 | Joyce | |
| 4,920,260 A | 4/1990 | Victor et al. | |
| 5,052,027 A * | 9/1991 | Poklemba et al. | 375/350 |
| 5,288,993 A | 2/1994 | Bidiville et al. | |
| 5,345,527 A | 9/1994 | Lebby et al. | |
| 5,391,868 A | 2/1995 | Vampola et al. | |
| 5,448,508 A * | 9/1995 | Ono et al. | 708/445 |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A | 7/1997 | Allen et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,781,229 A | 7/1998 | Zediker et al. | |

(Continued)

FOREIGN PATENT DOCUMENTS

WO    WO99/46603 A1    9/1999

(Continued)

OTHER PUBLICATIONS

USPTO Miscellaneous Action for U.S. Appl. No. 11/123,525 dated Jun. 10, 2005; 1 page.

(Continued)

*Primary Examiner*—Tan V Mai

(57) ABSTRACT

An averaging circuit and method are provided to compute a running average over a number of samples without the need for maintaining a large sample queue or register. Generally, the method includes the steps of (i) receiving and accumulating data samples in a plurality of sample-accumulators while counting the number of samples received in a sample-counter; (ii) alternately selecting the sum of the samples accumulated in each of the sample-accumulators; (iii) dividing the sum of the samples accumulated in a selected sample-accumulator by the number of samples received to provide an average of the samples accumulated therein; and (iv) interleaving selection of the plurality of sample-accumulators and alternating reset of each to provide a running average over a number of samples.

20 Claims, 7 Drawing Sheets

U.S. PATENT DOCUMENTS

| | | | |
|---|---|---|---|
| 5,786,804 | A | 7/1998 | Gordon |
| 5,825,044 | A | 10/1998 | Allen et al. |
| 5,854,482 | A | 12/1998 | Bidiville et al. |
| 5,907,152 | A | 5/1999 | Dandliker et al. |
| 5,963,197 | A | 10/1999 | Bacon et al. |
| 5,994,710 | A | 11/1999 | Knee et al. |
| 6,031,218 | A | 2/2000 | Piot et al. |
| 6,034,379 | A | 3/2000 | Bunte et al. |
| 6,037,643 | A | 3/2000 | Knee |
| 6,057,540 | A | 5/2000 | Gordon et al. |
| 6,097,371 | A | 8/2000 | Siddiqui et al. |
| 6,137,566 | A | 10/2000 | Leonard et al. |
| 6,151,015 | A | 11/2000 | Badyal et al. |
| 6,172,354 | B1 | 1/2001 | Adan et al. |
| 6,194,695 | B1 | 2/2001 | Barrows |
| 6,201,572 | B1 | 3/2001 | Chou |
| 6,218,659 | B1 | 4/2001 | Bidiville et al. |
| 6,222,174 | B1 | 4/2001 | Tullis et al. |
| 6,225,617 | B1 | 5/2001 | Dandliker et al. |
| 6,226,092 | B1 | 5/2001 | de Lega |
| 6,233,368 | B1 | 5/2001 | Badyal et al. |
| 6,243,134 | B1 | 6/2001 | Beiley |
| 6,255,643 | B1 | 7/2001 | Sayag |
| 6,281,881 | B1 | 8/2001 | Siddiqui et al. |
| 6,281,882 | B1 | 8/2001 | Gordon et al. |
| 6,304,330 | B1 | 10/2001 | Millerd et al. |
| 6,326,950 | B1 | 12/2001 | Liu |
| 6,330,057 | B1 | 12/2001 | Lederer et al. |
| 6,351,257 | B1 | 2/2002 | Liu |
| 6,396,479 | B2 | 5/2002 | Gordon |
| 6,421,045 | B1 | 7/2002 | Venkat et al. |
| 6,424,407 | B1 | 7/2002 | Kinrot et al. |
| 6,433,780 | B1 | 8/2002 | Gordon et al. |
| 6,452,683 | B1 | 9/2002 | Kinrot et al. |
| 6,455,840 | B1 | 9/2002 | Oliver et al. |
| 6,462,330 | B1 | 10/2002 | Venkat et al. |
| 6,476,970 | B1 | 11/2002 | Smith |
| 6,529,184 | B1 | 3/2003 | Julienne |
| 6,585,158 | B2 | 7/2003 | Norskog |
| 6,603,111 | B2 | 8/2003 | Dietz et al. |
| 6,608,585 | B2 | 8/2003 | Benitz |
| 6,621,483 | B2 | 9/2003 | Wallace et al. |
| 6,642,506 | B1 | 11/2003 | Nahum et al. |
| 6,657,184 | B2 | 12/2003 | Anderson et al. |
| 6,664,948 | B2 | 12/2003 | Crane et al. |
| 6,674,475 | B1 | 1/2004 | Anderson |
| 6,677,929 | B2 | 1/2004 | Gordon et al. |
| 6,703,599 | B1 | 3/2004 | Casebolt et al. |
| 6,710,855 | B2 | 3/2004 | Shiraishi |
| 6,737,636 | B2 | 5/2004 | Dietz et al. |
| 6,741,335 | B2 | 5/2004 | Kinrot et al. |
| 6,753,851 | B2 | 6/2004 | Choi et al. |
| 6,756,980 | B2 | 6/2004 | Hayashi |
| 6,774,351 | B2 | 8/2004 | Black |
| 6,774,915 | B2 | 8/2004 | Rensberger |
| 6,778,571 | B2 | 8/2004 | Vaughan |
| 6,795,056 | B2 | 9/2004 | Norskog et al. |
| 6,809,403 | B2 | 10/2004 | Gee |
| 6,809,723 | B2 | 10/2004 | Davis |
| 6,819,314 | B2 | 11/2004 | Black |
| 6,823,077 | B2 | 11/2004 | Dietz et al. |
| 6,947,459 | B2 | 9/2005 | Kurtz et al. |
| 6,950,094 | B2 | 9/2005 | Gordon et al. |
| 6,967,321 | B2 | 11/2005 | Leong et al. |
| 6,977,645 | B2 | 12/2005 | Brosnan |
| 7,019,733 | B2 | 3/2006 | Koay |
| 7,042,575 | B2 | 5/2006 | Carlisle et al. |
| 7,049,578 | B2 | 5/2006 | Wada et al. |
| 7,098,894 | B2 | 8/2006 | Yang et al. |
| 7,119,323 | B1 | 10/2006 | Brosnan et al. |
| 7,126,585 | B2 | 10/2006 | Davis et al. |
| 7,138,620 | B2 | 11/2006 | Trisnadi et al. |
| 7,148,078 | B2 | 12/2006 | Moyer et al. |
| 7,161,682 | B2 | 1/2007 | Xie et al. |
| 7,205,521 | B2 | 4/2007 | Gruhlke et al. |
| 7,236,239 | B2 | 6/2007 | Hase |
| 7,253,837 | B2 | 8/2007 | Henderson et al. |
| 7,279,668 | B2 | 10/2007 | Misek |
| 7,280,140 | B2 | 10/2007 | Henderson |
| 7,285,766 | B2 | 10/2007 | Carlisle et al. |
| 7,321,359 | B2 | 1/2008 | Xie et al. |
| 7,439,954 | B2 | 10/2008 | Theytaz et al. |
| 7,443,427 | B2 | 10/2008 | Takayanagi |
| 7,460,979 | B2 | 12/2008 | Buckner |
| 7,492,351 | B2 | 2/2009 | VanWiggeren et al. |
| 2002/0093487 | A1 | 7/2002 | Rosenberg |
| 2003/0058506 | A1 | 3/2003 | Green et al. |
| 2005/0083303 | A1 | 4/2005 | Schroeder et al. |
| 2005/0156915 | A1 | 7/2005 | Fisher |
| 2005/0228838 | A1 | 10/2005 | Stetson et al. |
| 2005/0258346 | A1 | 11/2005 | LeHoty et al. |
| 2005/0259078 | A1 | 11/2005 | Roxlo et al. |
| 2005/0259097 | A1 | 11/2005 | Lehoty et al. |
| 2005/0285960 | A1 | 12/2005 | Purcell et al. |
| 2006/0028442 | A1 | 2/2006 | Bynum et al. |

FOREIGN PATENT DOCUMENTS

| | | | |
|---|---|---|---|
| WO | WO02/48853 | A1 | 6/2002 |

OTHER PUBLICATIONS

USPTO Non-Final Rejection for U.S. Appl. No. 11/123,525 dated Apr. 14, 2008; 20 pages.

International Search Report of the International Searching Authority for U.S. Appl. No. PCT/US2005/017375 dated Oct. 2, 2006; 2 pages.

USPTO Notice of Allowance for U.S. Appl. No. 11/123,326 dated Jul. 9, 2007; 4 pages.

USPTO Non-Final Rejection for U.S. Appl. No. 11/123,326 dated Mar. 21, 2007; 6 pages.

USPTO Miscellaneous Action for U.S. Appl. No. 11/123,326 dated Jun. 8, 2005; 1 page.

R.E. Kalman, "A New Approach to Linear Filtering and Prediction Problems," Transactions of the ASME-Journal of Basic Engineering, Copyright 1960, Research Institute for Advanced Study; Baltimore, MD; 12 pages.

USPTO Non-Final Rejection for U.S. Appl. No. 11/123,500 dated Apr. 11, 2008; 17 pages.

USPTO Miscellaneous Action for U.S. Appl. No. 11/123,500 dated Jun. 8, 2005; 1 page.

"The Examiner's Grounds for Rejection" from Korean Patent Office for U.S. Appl. No. 10-2006-7026956; Dec. 31, 2007; 4 pages.

International Search Report of the International Searching Authority for International No. PCT/US2005/017459 dated Sep. 26, 2006; 2 pages.

The Written Opinion of the International Searching Authority for International Application No. PCT/US2005/01745 dated Sep. 26, 2006; 2 pages.

USPTO Notice of Allowance for U.S. Appl. No. 11/128,988 dated Feb. 2, 2006; 7 pages.

USPTO Non-Final Rejection for U.S. Appl. No. 11/123,527 dated Apr. 9, 2008; 18 pages.

International Search Report of the International Searching Authority for International Application No. PCT/US2005/017461 dated Nov. 23, 2006; 3 pages.

USPTO Notice of Allowance for U.S. Appl. No. 11/261,316 dated Aug. 23, 2006; 6 pages.

USPTO Non-Final Rejection for U.S. Appl. No. 11/261,316 dated Jun. 6, 2006; 6 pages.

USPTO Notice of Allowance for U.S. Appl. No. 11/582,776 dated May 16, 2008; 6 pages.

USPTO Non-Final Rejection for U.S. Appl. No. 11/582,776 dated Sep. 10, 2007; 8 pages.

USPTO Notice of Allowance for U.S. Appl. No. 11/292,470 dated May 30, 2008; 7 pages.

USPTO Final Rejection for U.S. Appl. No. 11/292,470 dated Sep. 19, 2007; 10 pages.
USPTO Non-Final Rejection for U.S. Appl. No. 11/292,470 dated Jan. 17, 2007; 12 pages.
USPTO Notice of Allowance for U.S. Appl. No. 11/268,898 dated Apr. 19, 2007; 9 pages.
USPTO Final Rejection for U.S. Appl. No. 11/303,365 dated Jan. 2, 2008; 11 pages.
USPTO Non-Final Rejection for U.S. Appl. No. 11/303,365 dated Apr. 2, 2007; 13 pages.
USPTO Notice of Allowance for U.S. Appl. No. 11/271,039 dated Jun. 5, 2007; 7 pages.
USPTO Final Rejection for U.S. Appl. No. 11/271,039 dated Mar. 16, 2007; 8 pages.
USPTO Non-Final Rejection for U.S. Appl. No. 11/271,039 dated Aug. 8, 2006; 7 pages.
USPTO Notice of Allowance for U.S. Appl. No. 11/223,389 dated Apr. 26, 2007; 7 pages.
USPTO Final Rejection for U.S. Appl. No. 11/223,389 dated Mar. 5, 2007; 5 pages.
USPTO Non-Final Rejection for U.S. Appl. No. 11/223,389 dated Jun. 26, 2006; 12 pages.
USPTO Notice of Allowance for U.S. Appl. No. 11/303,363 dated Sep. 17, 2009; 4 pages.
USPTO Non-Final Rejection for U.S. Appl. No. 11/303,363 dated Apr. 16, 2009; 4 pages.
USPTO Notice of Allowance for U.S. Appl. No. 11/324,424 dated Oct. 2, 2007; 4 pages.
USPTO Non-Final Rejection for U.S. Appl. No. 11/324,424 dated Apr. 12, 2007; 6 pages.
USPTO Notice of Allowance for U.S. Appl. No. 11/389,903 dated Sep. 19, 2007; 7 pages.
USPTO Non-Final Rejection for U.S. Appl. No. 11/432,987 dated Sep. 3, 2009; 10 pages.
USPTO Advisory Action for U.S. Appl. No. 11/432,987 dated Jul. 22, 2009; 3 pages.
USPTO Final Rejection for U.S. Appl. No. 11/432,987 dated May 6, 2009; 8 pages.
USPTO Non-Final Rejection for U.S. Appl. No. 11/432,987 dated Oct. 20, 2008; 10 pages.
USPTO Final Rejection for U.S. Appl. No. 11/432,987 dated May 13, 2008; 8 pages.
USPTO Non-Final Rejection for U.S. Appl. No. 11/432,987 dated Nov. 5, 2007: 7 pages.
International Written Opinion of the International Searching Authority for International Application No. PCT/US2007/007062 dated Nov. 21, 2008; 5 pages.
Search Report of the International Searching Authority for International Application No. PCT/US2007/007062 dated Nov. 21, 2008; 2 pages.
USPTO Notice of Allowance for U.S. Appl. No. 11/129,967 dated Aug. 6, 2007; 4 pages.
USPTO Final Rejection for U.S. Appl. No. 11/129,967 dated May 31, 2007; 8 pages.
USPTO Non-Final Rejection for U.S. Appl. No. 11/129,967 dated Dec. 6, 2006; 8 pages.
USPTO Notice of Allowance for U.S. Appl. No. 111124,858 dated Sep. 16, 2009; 9 pages.
USPTO Non-Final Rejection for U.S. Appl. No. 11/124,858 dated Feb. 25, 2009; 23 pages.
USPTO Non-Final Rejection for U.S. Appl. No. 11/124,858 dated Oct. 8, 2008; 17 pages.
1st Office Action for Korean Patent U.S. Appl. No. 10-2006-7026821 dated Apr. 28, 2008; 2 pages.
1st Office Action for China Patent Application No. 200580022643.5 dated Jan. 4, 2008; 14 pages.
International Search Report of the International Searching Authority for Application No. PCT/US2005/017462 dated Sep. 14, 2006; 4 pages.
Written Opinion of the International Searching Authority for Application No. PCT/US2005/017462 dated Sep. 14, 2006; 6 pages.
USPTO Notice of Allowance for Application No. 11/124,858 dated Jan. 8, 2010; 7 pages.
USPTO Notice of Allowance for Application No. 11/432,987 dated Feb. 4, 2010; 7 pages.

* cited by examiner

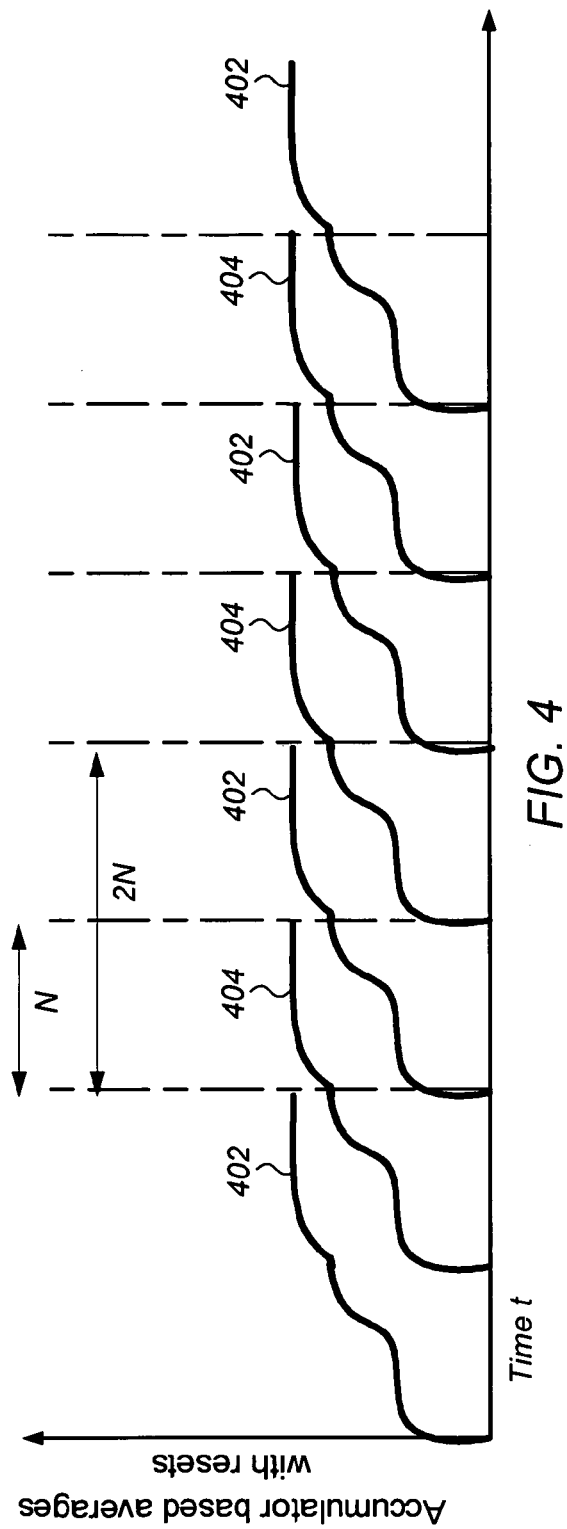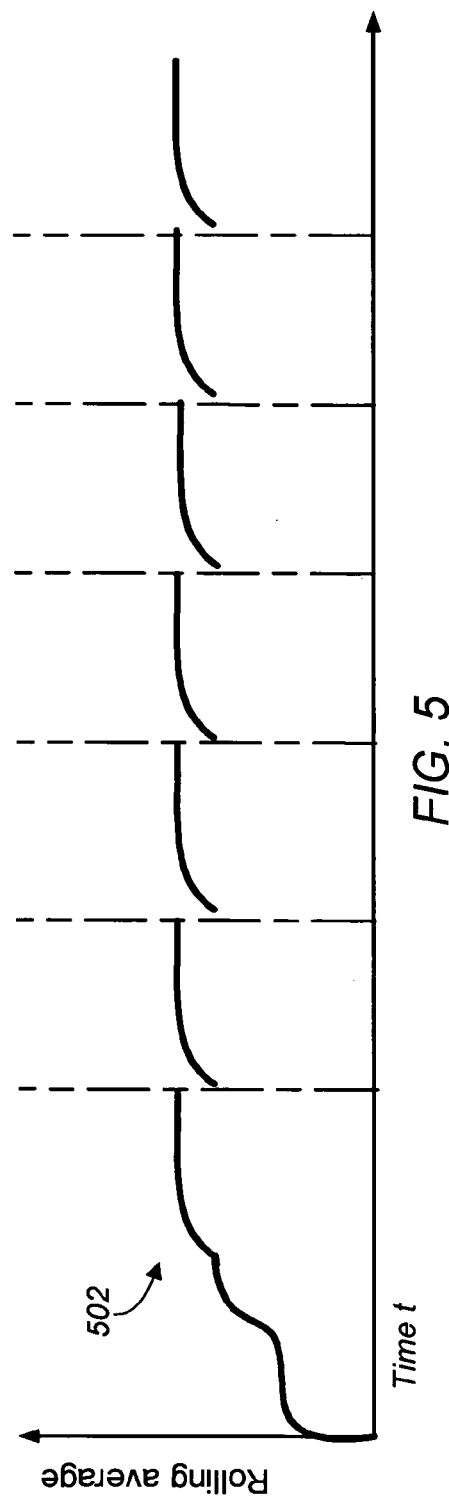

SIGNAL AVERAGING CIRCUIT AND METHOD FOR SAMPLE AVERAGING

TECHNICAL FIELD

The present invention relates generally to signal processing, and more particularly to a signal averaging circuit and method to compute a running average over a fixed number of samples without the need for maintaining large queues or queuing registers.

BACKGROUND OF THE INVENTION

Signal averaging circuits and methods are used in a wide range of applications including, for example, processing motion-sensitive output from a array of photo-detectors in an optical navigation system.

One common application of a signal averaging circuit is to compute a running average, weighted or un-weighted, over a fixed number of samples. A conventional method for computing a running average over a predetermined number (N) of samples is schematically illustrated in FIG. 1. Referring to FIG. 1, a queue 100, such as one implemented using a first-in-first-out or FIFO register, of depth N is required for storing N samples. New or most recent sample values are loaded or pushed into a head of the queue, shown as address 0, while simultaneously old sample is popped out from a tail of the queue, shown as address N-1, and discarded. A sum of all entries in queue is computed at every update of queue. Once the queue is full, the running average can be computed at every time a new sample is received by dividing the sum of the values in the queue by N.

A block diagram of a conventional signal averaging circuit for computing a running average over N samples according to the above method is shown in FIG. 2. Referring to FIG. 2, the averaging circuit 200, includes a queue storage 202, such as a FIFO register, of depth N, for storing N samples, a sum storage 204 for storing a sum of values stored in the queue, an adder 206 for adding a new sample to the sum in the sum storage, a subtractor 208 for subtracting the old, discarded sample value to generate an updated sum, which is stored in sum storage and divided by N in a divider 210 to compute the running or rolling average over N samples. The averaging circuit 200 shown in FIG. 2 is accurate and relatively fast, since it is not necessary to sum all values stored in the queue 202 every time a new sample is received. However, the above circuit is not wholly satisfactory for a number of reasons.

In particular, the implementation of FIG. 2 requires a large number of transistors, often referred to as gate count, for implementation of the storage queue 202. For example, one use for an averaging circuit, i.e., estimating average speed of the motion from an array of photo-detectors in an optical navigation system, typically requires a storage queue capable of storing about 64 samples, i.e., N=64, and has a gate count of from about 10 thousand to about 100 thousand gates. Because the averaging circuit is typically fabricated as an application specific integrated circuit (ASIC) along with the photo-detector array and a signal processor, this can account for as much as 10% of the IC or chip space, and significantly impact the power consumption of the optical navigation system in which it is included. This is especially of concern in battery operated devices, such as a wireless optical mouse.

Yet another problem with conventional averaging methods and circuits is an inability to vary the length or number of samples, N, over which the running average is computed. That is once the ASIC has been designed and fabricated for a specific value of N, it cannot be changed, rather a new ASIC must be designed and fabricated. Moreover, because the size of the storage queue increases linearly with N there are practical limits on the number of samples over which the running average can be computed.

Accordingly, there is a need for averaging circuit and method to compute a running average over a number of samples that eliminates the need for maintaining large queues or queuing registers. It is further desirable that the circuit and method enables adjustment of the averaging length (N) without significant impact if any on design of an ASIC in which the averaging circuit is included.

The present invention provides a solution to this and other problems, and offers further advantages over conventional signal averaging circuits and methods.

BRIEF DESCRIPTION OF THE DRAWINGS

These and various other features and advantages of the present invention will be apparent upon reading of the following detailed description in conjunction with the accompanying drawings and the appended claims provided below, where:

FIG. 4 is a graph illustrating accumulator based averages according to an embodiment of the present invention;

FIG. 5 is a graph illustrating a running or rolling average of a number of samples computed according to a method of the present invention;

DETAILED DESCRIPTION

Figure 1:
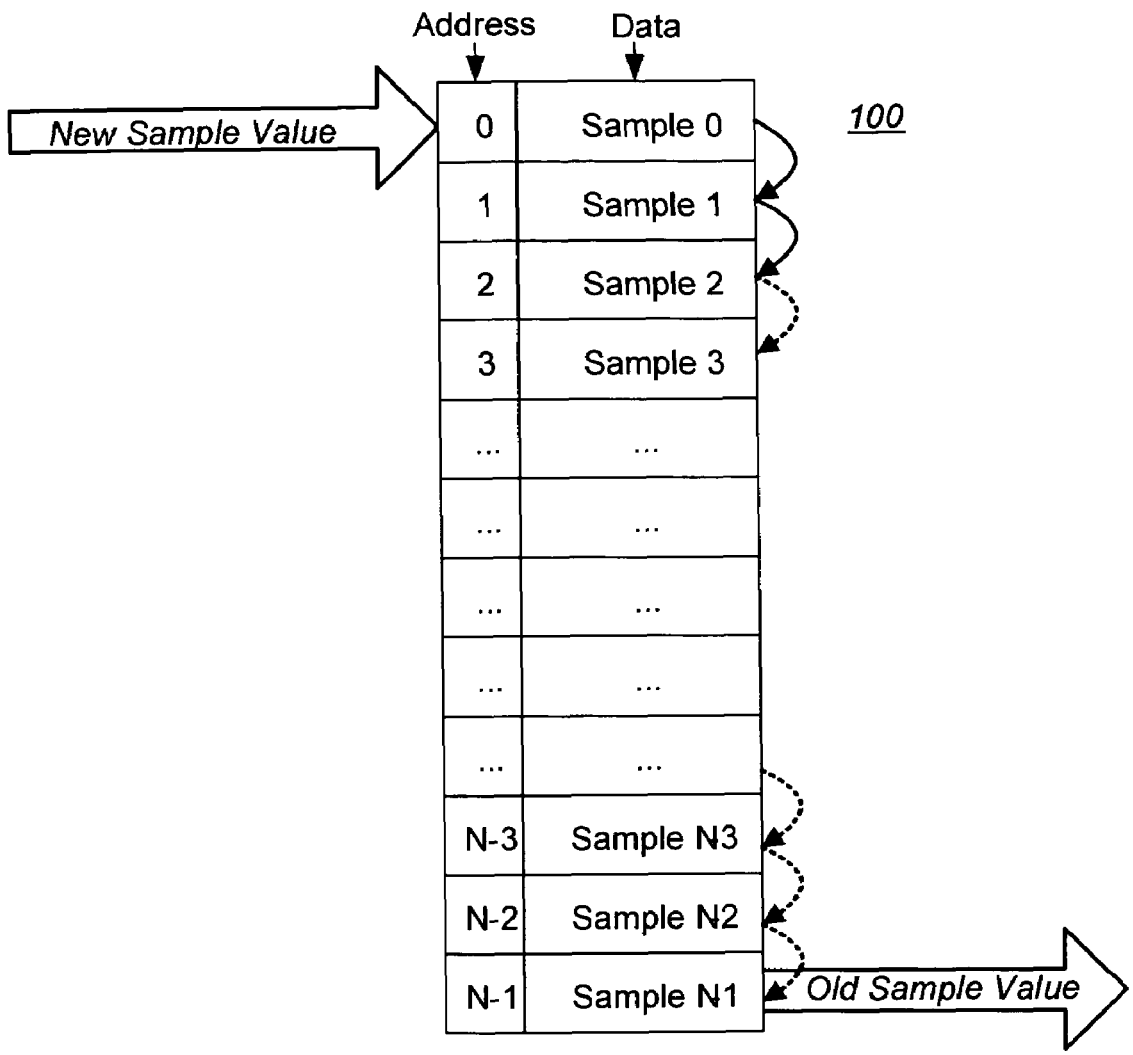
FIG. 1 (prior art) is a schematic diagram of a queue or register for storing samples illustrating a conventional method for computing a running average over a fixed number of samples.
Figure 2:
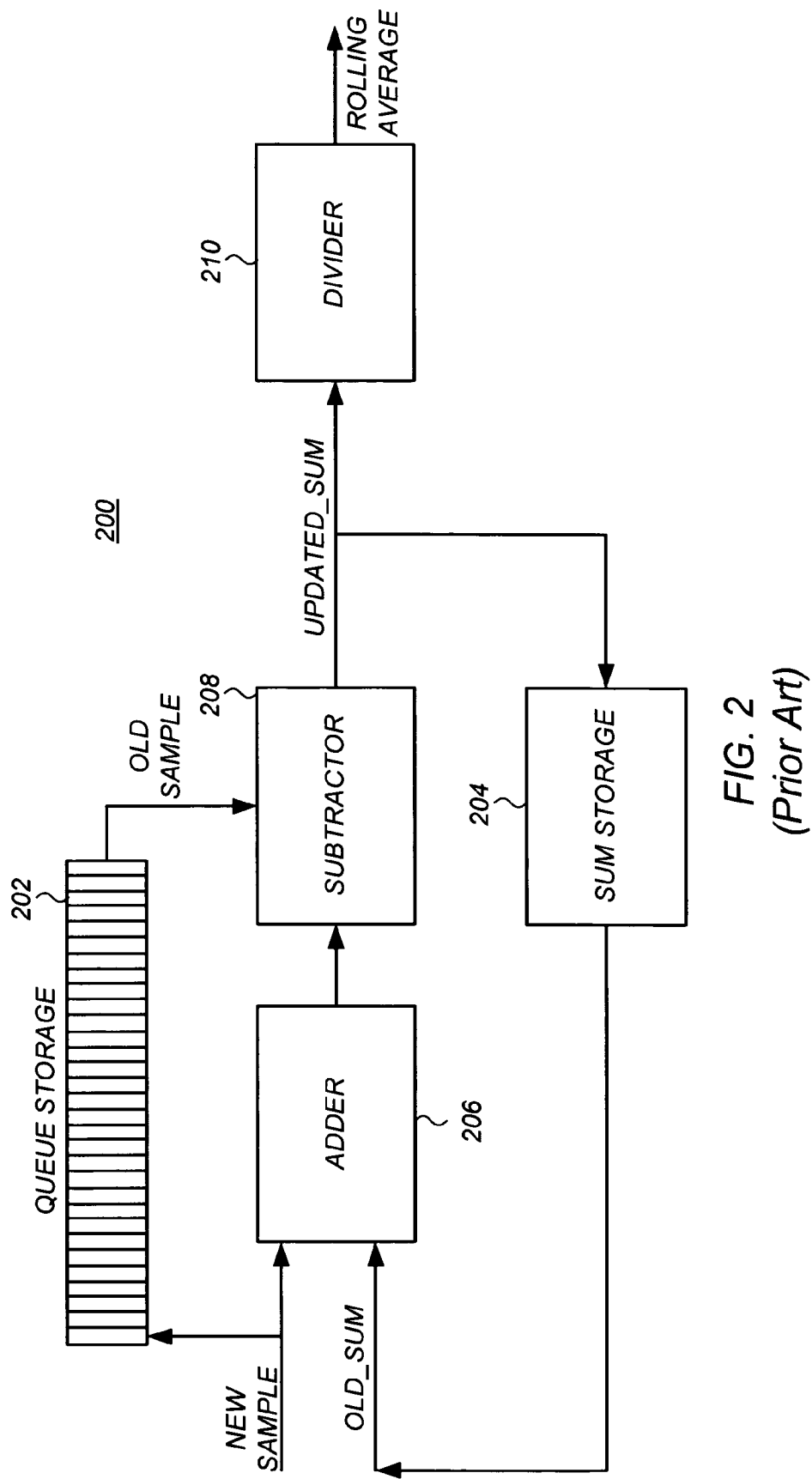
FIG. 2 (prior art) is a block diagram of a conventional signal averaging circuit for computing a running average over a fixed number of samples according to a conventional signal processing method.

The present invention is directed generally to signal processing, and more particularly, to an averaging circuit and method to compute a running average over a fixed number of samples without the need for maintaining large queues or queuing registers.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

The averaging circuit and method are particularly advantageous for processing signals from a photo-detector, such as a photodiode or other light sensitive element, in a array used in an optical navigation system, such as an optical computer mouse or an optical trackball.

For purposes of clarity, many of the details of optical navigation systems in general and signal processing circuits for optical navigation systems in particular that are widely known and are not relevant to the present invention have been omitted from the following description. Speckle-based optical navigation systems are described, for example, in co-pending, commonly assigned U.S. patent application No. 11/129,967, entitled, "Optical Positioning Device Having Shaped Illumination," filed on May 16, 2005 by Clinton B. Carlisle et al., and incorporated herein by reference in its entirety.

Briefly, the averaging method of the present invention involves: (i) receiving and accumulating digital samples of a signal in at least two sample-accumulators; (ii) counting the number of samples received in a sample-counter; (iii) alternately resetting the two sample-accumulators at regular intervals offset with respect to each other by a predetermined number (N) of samples and resetting the sample counter when it reaches N; (iv) dividing the sum of samples accumulated by the number of samples accumulated after at-least N samples have been received in sample-accumulator to compute and output an average; and (v) alternately selecting the average output from one sample-accumulator while the other has just been reset as a running average over (N+sample counter) samples, thereby eliminating the need for maintaining large queues or queuing registers.

In general the sample-counter is reset simultaneously with each sample-accumulator reset. That is the sample-counter should be reset following a predetermined number N of cycles, and N is the offset number of samples between sample-accumulator resets. Each sample accumulator resets after (M·N) samples, where M is the number of sample-accumulators, a whole number greater than or equal to two ($\geq 2$), the resets from the M sample accumulators are spaced out evenly so that each reset occurs N samples after the other. The sample accumulator that has accumulated at least ((M−1)·N) samples but less than (M·N) samples, will be used to compute the running average. So the equivalent running average length will be ((M−1)·N) samples. Alternatively, the offset number of samples (N) between sample accumulator resets can be selected in relation to the number of data bits supported by the sample-counter such that the sample-counter rolls over (automatically resets to zero) after the Nth sample has been received and counted thereby eliminating the need for resetting the sample-counter. For example, when the sample-counter is implemented as a 6-bit binary counter N can be selected as 64 so that after the counter has counted 64 samples from 0 to 63 it rolls over to 0.

Exemplary embodiments of the averaging circuit and method according to the present invention will now be described in greater detail with reference to FIGS. 3 through 6.

Figure 3:
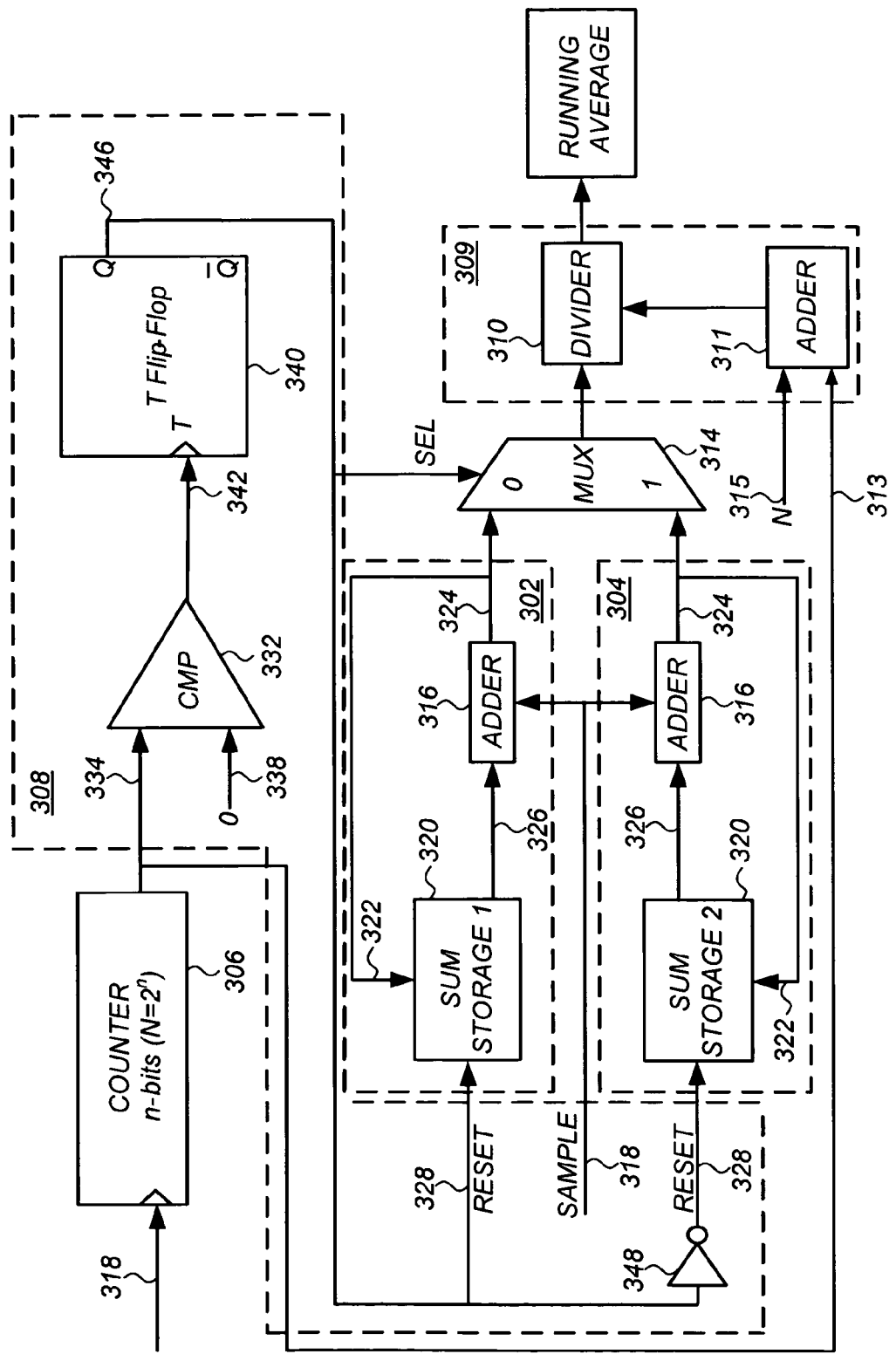
FIG. 3 is a block diagram of a signal averaging circuit for computing a running average over a number of samples according to an embodiment of the present invention.

In one embodiment, shown in FIG. 3, the averaging circuit includes first and second sample-accumulator 302, 304, a sample-counter 306, a reset circuit 308, a dividing circuit 309, and a selection circuit or selector, such as a multiplexer (MUX 314). Generally, each sample-accumulator includes an adding circuit or adder 316 to which the new sample is applied over sampling line 318, and a sum storage 320 storing, until reset, the sum of the previous samples to which the new sample is added. The sum storage has an input 322 coupled to an output 324 of the associated adder 316, an output 326 coupled to an input of the adder, and a reset input or reset 328 coupled to the reset circuit 308. In FIG. 3, the dividing circuit includes a divider 310 and adder 311. The divider has a first or operand input coupled to an output of the MUX 314 and a second or divisor input coupled to the adder 311. The adder 311 has a first input 313 coupled to an output of the sample-counter 306 and a second input 315 coupled to a fixed value N so that the divider 310 divides the sum from the selected sample-accumulator 302, 304, by the sum of N and the number of samples received since the last sample-counter reset. It will be appreciated that this number, the operand, will always be a whole number between N and 2N to produce or compute a running average over N once the first N samples have been received to the sample-counter 306, and to the reset circuit 308 to divide the sum of the sample-accumulator 302, 304, by the number of samples received by the sample-accumulator 302, 304, since its reset. Although described in detail with respect to the embodiment shown in FIG. 3, it will be appreciated that other embodiments are possible, including those in which the dividing circuit includes one or more adders providing operands to multiple dividers, which are coupled between the adders 316 of the sample-accumulators 302, 304, and the MUX 314 to select the quotient or sample-accumulator average rather than the undivided sample-accumulator sum.

In the embodiment shown, the sample-counter 306 is an n-bit forward counter, where n is the number of bits needed to express in binary form the predetermined number of samples (N) over which the average is computed. The sample-counter 306 has a frame trigger or input 330 coupled to the sample line 318 to count up the samples received in the sample-accumulators 302, 304, from an initial value of 0 to (N−1). It will be appreciated that other embodiments are possible, including those in which the sample-counter 306 is a down counter, and/or is reset by the reset circuit 308, thereby enabling the sample-counter to hold a value between 0 and a preselected multiple of N.

The reset circuit 308 generally includes a comparator (CMP 332) having a first n-bit input 334 coupled to an output of the sample-counter 306 and a second n-bit input 338 coupled to a n-bit value, here zero (0), to which the sample-counter 306 rolls over after counting up to N. The reset circuit 308 further includes a flip-flop 340, such as T flip-flop, having an input 342 coupled to an output of the comparator 332, and at least one output 346 coupled to the selection circuit, MUX 314, and to the reset inputs 328 of the sample-accumulators 302 and 304. In the embodiment shown the reset circuit 308 further includes an inverter 348 through which the output 346 is also coupled to the second sample-accumulator 304. However, it will be appreciated that the second sample-accumulator 304 may be instead be coupled directly to a second, inverting output from the flip-flop 340 without departing from the scope of the invention, and thereby eliminating the inverter 348.

The output of the selection circuit, MUX 314, operates to select the output of the appropriate accumulator, 302 or 304, at the appropriate time to provide a running average of the sampled signal over a predetermined number of samples, without the need for maintaining large queues or queuing registers.

A graph illustrating sample-accumulator averages output by the divider 310 is shown in FIG. 4. Referring to FIG. 4, graph segments 402 represent averages from the first sample-accumulator 302, which is first reset after 2N samples have been received, and then every 2N samples thereafter. Graph segments 404 represent averages from the second sample-accumulator 304, which is first reset after N samples have been received, and then every 2N samples thereafter. FIG. 5 is a graph illustrating a running or rolling average 502 of the sampled signal over a predetermined number of samples computed by alternately selecting or interleaving the averages output by the first and second sample-accumulators over time.

Figure 6:
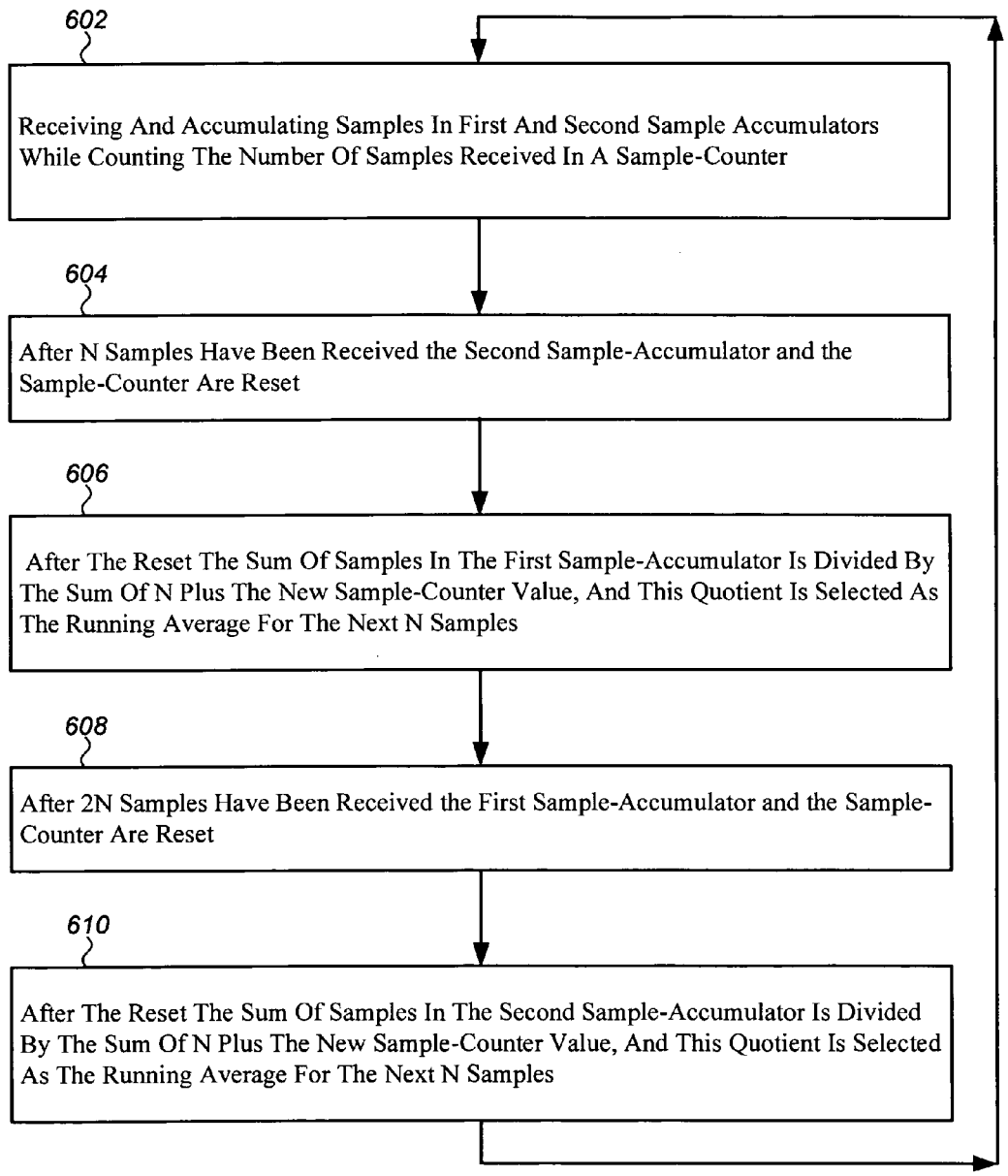
FIG. 6 is a flowchart of a method for computing a running average over a number of samples according to a method of the present invention using two sample-accumulators, a sample counter and dividers.

A method of computing a running average of a sampled signal over a predetermined number of samples using the averaging circuit of FIG. 3 will now be described in greater detail with reference to FIG. 6. FIG. 6 is a flowchart of a method for computing a running average over a number of samples according to a method of the present invention using two sample-accumulators, a sample counter and a divider. Referring to FIG. 6, the method begins with receiving and accumulating samples in both a first and a second sample accumulator while counting the number of samples received in a sample-counter in first step (step 602). After N samples (and subsequent odd sets of N samples) have been received the second sample-accumulator and the sample-counter are reset (step 604). After the reset the sum of samples in the first sample-accumulator is divided by the sum of N plus the new sample-counter value, and this quotient is selected as the running average for the next N samples (step 606). After 2N samples (and subsequent even sets of N samples) have been received the first sample-accumulator and the sample-counter are reset (step 608). After the reset the sum of samples in the second sample-accumulator is divided by the sum of N plus the new sample-counter value, and this quotient is selected as the running average for the next N samples (step 610). The above steps, steps 602-610, are then repeated to continue computing or estimating the running average of the sampled signal. That is, after each even set (second set, fourth set, . . . ) of N samples have been received the first sample-accumulator and the sample-counter are reset, and the quotient of the sum of the second sample-accumulator divided by N+new value in the sample-counter and is selected as the running average. After each odd set (first set, third set, . . . ) of N samples have been received the second sample-accumulator and the sample-counter are reset, and the quotient of the sum of the first sample-accumulator is divided by N+new value in the sample-counter and is selected as the running average.

The ability of an averaging circuit and method of the present invention to compute a running average over a number of samples without the need for maintaining a large sample queue or register is shown graphically in FIGS. 7 through 10. The data used in the following examples was processed from samples collected from COMB detector arrays of an optical navigation system, such as an optical computer mouse, moved by a testing stage or apparatus in a circular motion around a circle of 1 cm radius at a speed of about 40 cm/s.

Figure 7:
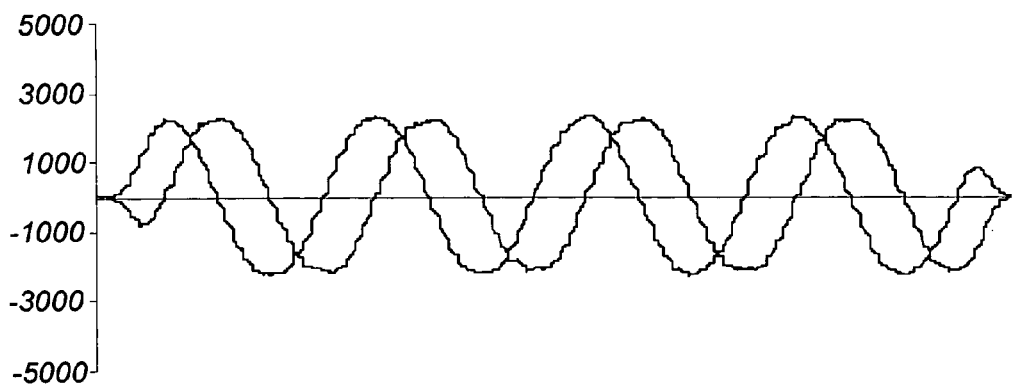
FIG. 7 is a graph showing estimated velocities over time for data samples collected from a COMB photo-detector array and averaged using two sample-accumulators with alternating resets at every 64-frames according to an embodiment of the present invention.
Figure 8:
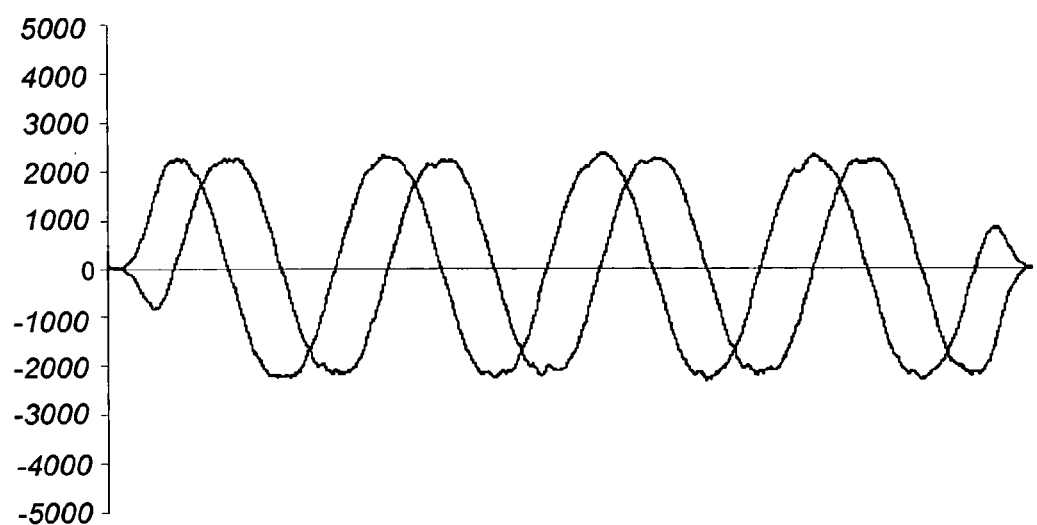
FIG. 8 (prior art) is a graph showing estimated velocities over time for data samples collected from a COMB photo-detector array and averaged using conventional 64-frame queues.

FIG. 7 is a graph showing the estimated velocities (in arbitrary units) along two orthogonal axes over time for data samples collected from the COMB photo-detector arrays and averaged using two sample-accumulators with alternating resets at every 64-frames according to an embodiment of the present invention. FIG. 8 is a graph showing estimated velocities over time for data samples collected from the same COMB photo-detector arrays and averaged using conventional 64-frame queues.

Figure 9:
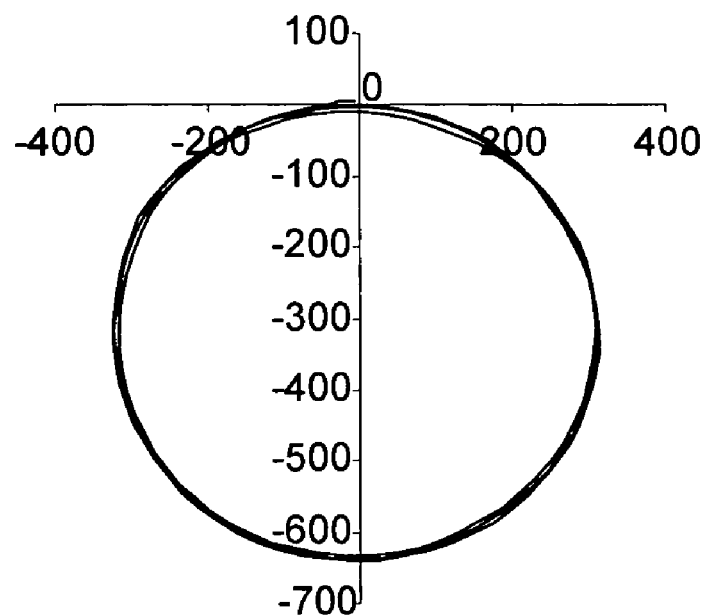
FIG. 9 is a graph or trace of the circular motion of an optical mouse calculated from data samples collected from a COMB photo-detector array and averaged using two sample-accumulators with alternating resets at every 64-frames according to an embodiment of the present invention.
Figure 10:
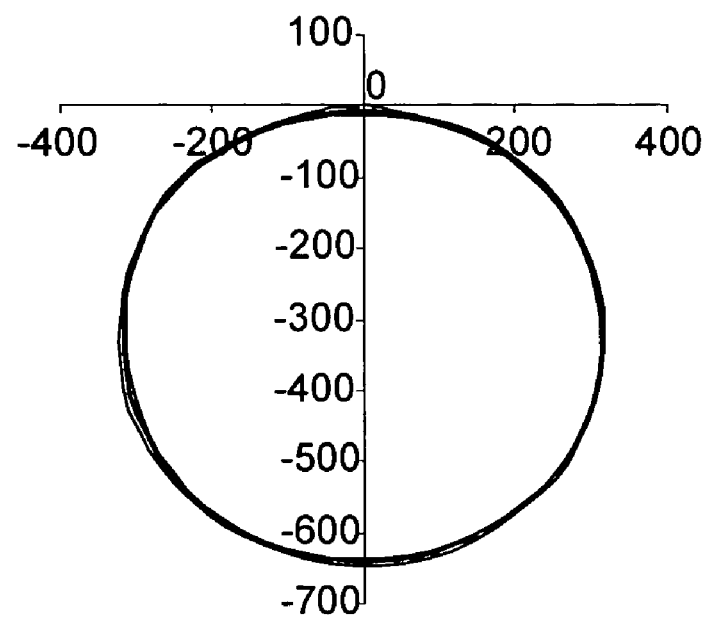
FIG. 10 (prior art) is a graph or trace of the circular motion of an optical mouse calculated from data samples collected from a COMB photo-detector array and averaged using conventional 64-frame queues.

FIG. 9 shows a graph or trace of the circular motion of an optical mouse calculated from data samples collected from the COMB photo-detector arrays and averaged using an embodiment of the method of the present invention to estimate speed and displacements of the motion. FIG. 10 shows the trace of the circular motion calculated from the same raw samples using the conventional averaging method with 64-frame queues to estimate the speed and displacements of the motion.

As can be seen from the graphs of FIGS. 7 through 10, results obtained from samples averaged using an averaging circuit and method of the present invention are substantially identical with those averaged using a conventional method while providing a 70% or greater reduction in gate count.

The advantages of the signal averaging circuit and method of the present invention over previous or conventional circuits and methods include: (i) the ability to compute a running average over a number of samples without the need for maintaining large queues or queuing registers; (ii) reduced power consumption in a circuit or device including the averaging circuit due to reduced gate counts; and (iii) the ability to change the averaging length over which the running average is computed without significant impact if any on design of an application specific integrated circuit (ASIC) in which the averaging circuit is included.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method of computing a running average of samples of data over a number of samples, the method comprising steps of:

receiving and accumulating data samples in plurality of sample-accumulators of a signal averaging circuit while counting the number of samples received in a sample counter;

alternately selecting an average of the samples accumulated in each of the plurality of sample accumulators by dividing the sum of the samples accumulated in each of the plurality of sample accumulators by the number of samples accumulated therein; and alternately resetting each of the sample accumulators after a number (N) of samples have been received, whereby a running average is provided over ((M−)·N) samples where M is the number of sample-accumulators.

2. A method according to claim 1, wherein the step of alternately selecting an average of the samples accumulated in each of the plurality of sample-accumulators comprises the steps of
dividing the sum of the samples accumulated in each of the plurality of sample-accumulators by the number of samples received in each of the plurality of sample-accumulator to provide from each of the plurality of sample-accumulators an average of the samples accumulated therein; and
interleaving selection of the average of the samples accumulated from each of the plurality of sample-accumulators.

3. A method according to claim 1, wherein the step of alternately selecting an average of the samples accumulated in each of the plurality of sample-accumulators comprises the steps of:
alternately selecting the sum of the samples accumulated in each of the plurality of sample-accumulators; and
dividing the sum of the samples accumulated in a selected sample-accumulator by the number of samples received to provide an average of the samples accumulated therein.

4. A method according to claim 3, further comprising the step of resetting the sample-counter following N of cycles.

5. A method according to claim 4, wherein the step of dividing the sum of the samples comprises the step of dividing the sum of the samples accumulated in a selected sample-accumulator by the sum of ((M−1)·N ) and the number of samples received after the last sample counter reset where M is number of sample-accumulators.

6. A method according to claim 5, wherein the step of receiving and accumulating samples comprises the step of receiving and accumulating samples in a first and a second sample-accumulator.

7. A method according to claim 6, wherein the step of interleaving selection of the average and alternating reset of each of the sample-accumulators comprises the steps of:
after N samples have been received resetting the second sample-accumulator while resetting the sample counter after the reset selecting as the running average the average of the samples accumulated in the first sample-accumulator;
after 2N samples have been received resetting the first sample-accumulator while resetting the sample-counter after the reset selecting as the running average the average of the samples accumulated in the second sample-accumulator; and
repeating the above steps.

8. A method according to claim 1, further comprising an initial step of selecting the number (N) of samples over which the running average is to be provided.

9. A signal averaging circuit for computing a running average over a number of samples of data, the circuit comprising:
a plurality of sample-accumulators to receive and accumulate samples;
a sample-counter to count the number of samples received up to a predetermined number (N);
a selection circuit to alternately select a sum of the samples accumulated in each of the plurality of sample-accumulators;
a divider to divide the sum of the samples accumulated in the selected sample-accumulator by the sum of ((M−1)·N) and the number of samples received after the last sample counter reset to provide from the selected sample-accumulator an average of the samples accumulated therein; and
a reset circuit to alternately reset each of the sample-accumulators after N samples have been received, whereby, a running average is provided over ((M−1)·N) samples where M is number of sample accumulators.

10. A circuit according to claim 9, wherein the reset circuit is configured to reset the sample-counter following N of cycles.

11. A circuit according to claim 10, wherein the plurality of sample-accumulators comprises a first sample-accumulator and a second sample-accumulator.

12. A circuit according to claim 11, wherein the selection circuit is adapted to select the sum of the samples accumulated in the first sample-accumulator to compute the running average after N samples (and subsequent odd sets of N samples) have been received, and to select the sum of the samples accumulated in the second sample-accumulator to compute the running average after 2N samples (and subsequent even sets of N samples) have been received.

13. A circuit according to claim 12, wherein the reset circuit is adapted to reset the second sample-accumulator after N samples (and subsequent odd sets of N samples) have been received while the average of the samples accumulated in the first sample-accumulator is selected as the running average, and to reset the first sample-accumulator after 2N samples (and subsequent even sets of N samples) have been received while the average of the samples accumulated in the second sample-accumulator is selected as the running average.

14. A circuit according to claim 13, wherein the sample-counter is a n-bit forward counter where $N=2^n$, and wherein the sample-counter is configured to roll over to zero after each set of N samples has been received.

15. A signal averaging circuit for computing a running average over a number of samples of data the circuit comprising:
a plurality of sample-accumulating means for receiving and accumulating digital samples of a signal;
counting means for counting the number of samples received in the plurality of sample-accumulating means;
selection means for alternately selecting from an output of each of the plurality of accumulating means a sum of the samples accumulated therein;
dividing means for dividing the sum of the samples accumulated in the selected sample-accumulating means by the number of samples received in the selected sample-accumulating means to provide average of the samples accumulated therein; and
reset means for alternately resetting the plurality of sample-accumulating means at regular intervals offset with respect to each other by N samples. whereby, a running average is provided.

16. A circuit according to claim 15, wherein the reset means is further adapted to reset the sample counter when it reaches N.

17. A circuit according to claim 16 wherein the plurality of sample-accumulating means comprises a first sample-accumulator and a second sample-accumulator.

18. A circuit according to claim 17, wherein the selection means is adapted to select the sum of the samples accumulated in the first sample-accumulator to compute the running average after N samples (and subsequent odd sets of N samples) have been received, and to select the sum of the samples accumulated in the second sample-accumulator to compute the running average after 2N samples (and subsequent even sets of N samples) have been received.

19. A circuit according to claim 18, wherein the reset means is adapted to reset the second sample-accumulator after N samples (and subsequent odd sets of N samples) have been received while the average of the samples accumulated in the first sample-accumulator is selected as the running average, and to reset the first sample-accumulator after 2N samples (and subsequent even sets of N samples) have been received while the average of the samples accumulated in the second sample-accumulator is selected as the running average.

20. A circuit according to claim 19, wherein the counting means is a n-bit forward counter where N=2n, and wherein the sample-counter is configured to roll over to zero after each set of N samples has been received.

* * * * *